United States Patent [19]
Müller et al.

[11] Patent Number: 4,759,248
[45] Date of Patent: Jul. 26, 1988

[54] BED KNIFE FOR GRANULATING PLASTIC STRANDS

[75] Inventors: Leo Müller, Bessenbach; Hermann Bertsch, Mannheim, both of Fed. Rep. of Germany

[73] Assignee: Automatik Apparate Maschinenbau GmbH, Ossostheim, Fed. Rep. of Germany

[21] Appl. No.: 34,074

[22] Filed: Apr. 2, 1987

[30] Foreign Application Priority Data

Apr. 3, 1986 [DE] Fed. Rep. of Germany ....... 3611179

[51] Int. Cl.$^4$ .......................... B23D 25/02; B26D 1/56
[52] U.S. Cl. ..................................... 83/349; 83/356.3; 83/658; 83/698; 83/699; 83/700; 83/906
[58] Field of Search ................. 83/658, 698, 699, 700, 83/356.3, 349, 906

[56] References Cited

U.S. PATENT DOCUMENTS 3,822,625 7/1974 Obenshain ............................. 83/349
4,204,451 5/1980 Reichert .............................. 83/658

FOREIGN PATENT DOCUMENTS 532643 11/1956 Canada ................................. 83/658
3108954 9/1982 Fed. Rep. of Germany .

Primary Examiner—Frank T. Yost
Assistant Examiner—Scott A. Smith

[57] ABSTRACT

A bed knife that acts together with a cutting blade moved past it, particularly for granulating plastic strands, consisting of individual aligned sections of the same type that are fastened to a supporting beam and whose knife edge consists of a cutter material. Each section consists essentially of ceramic cutter material and extends over the areas of feed and delivery of the material to be cut of the cut material. The section is provided with a cutout running in the direction of the bed knife that is aligned with the cutouts of all of the sections and changes into an outer surface of the section as a throat in comparison with the corresponding dimension of the cutout, with the cutouts containing a continuous bar extending through several sections. The bar presses the section against the supporting beam by means of screws passing through the throat that penetrate into the bar, with sections being connected to one another positively by the bar.

9 Claims, 2 Drawing Sheets

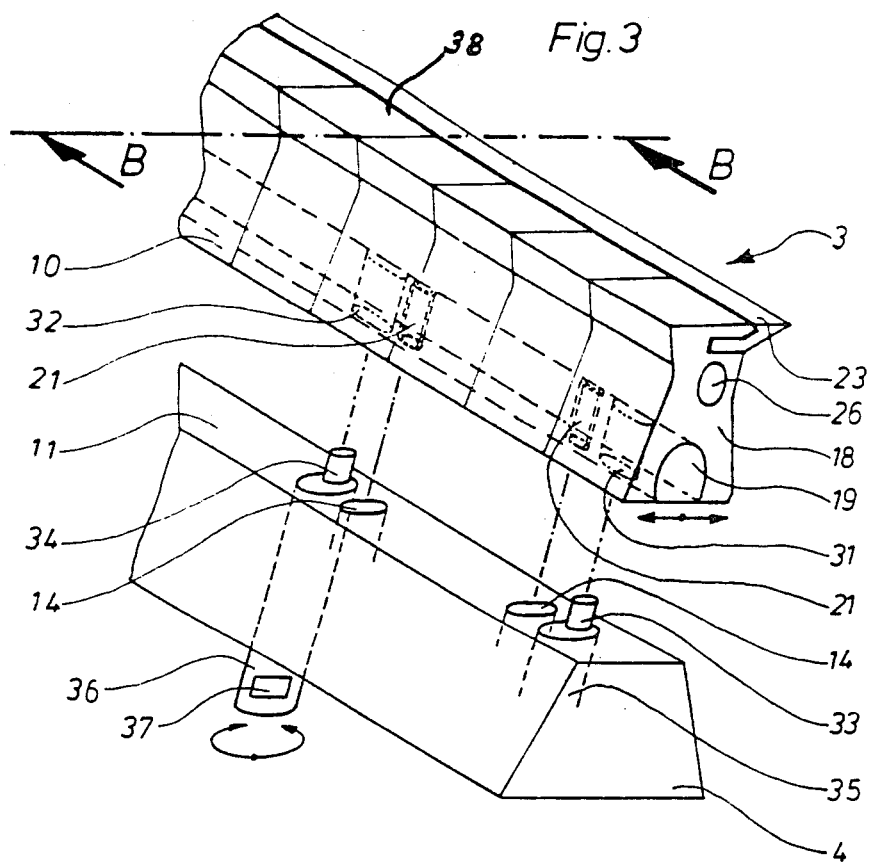
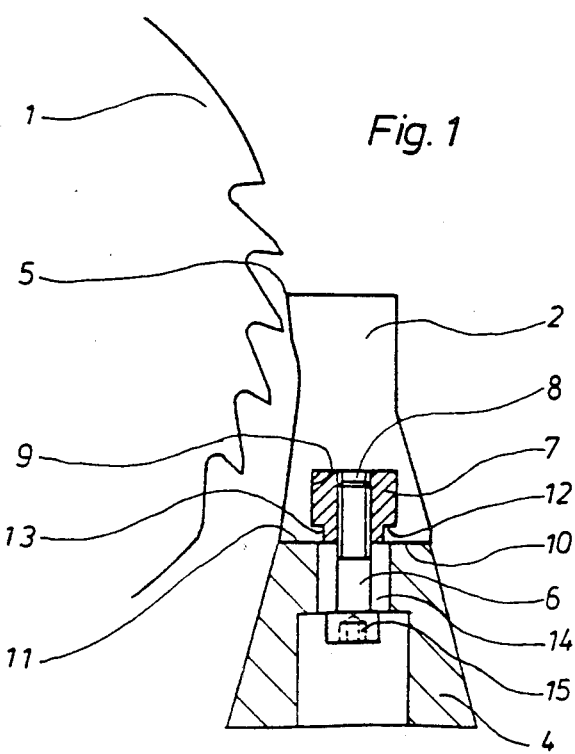

BED KNIFE FOR GRANULATING PLASTIC STRANDS

BACKGROUND OF THE INVENTION

A bed knife that acts together with a cutting blade moved past, particularly for granulating plastic strands.

This invention concerns a bed knife that acts together with a cutting blade moved past it, particularly for granulating plastic strands, consisting of individual sections of the same type of aligned with one another that are fastened to a supporting beam and whose knife edge consists of a cutter material.

SUMMARY OF THE PRIOR ART

Such a bed knife is revealed by German Patent Application Disclosure No. 3,108,954. In this bed knife, each of the individual sections has a knife edge of polycrystalline diamond material fastened in a carbide holder, which in turn rests in a section that is supported in multiples next to one another by a supporting beam so that a bed knife extending over the supporting beam is obtained that is composed by a number of assembled sections of this type. The diamond segments are welded to the particular sections by their particular carbide holders. A high-quality knife edge is obtained in this way, in which the cutter material is concentrated in the cutting area because of its processability and its cost, with the alignment of the individual sections with one another resulting in interchangeability of any damaged points of the bed knife, in a beneficial manner.

SUMMARY OF THE INVENTION

A bed knife in continuous operation is stressed particularly not only in its cutting region, but also in regions next to it in which the material to be cut comes into contact before the cutting process and thereafter, as the case may be. With the bed knife of the prior art, the possibility is provided for designing the section totally of carbide, aside from the knife edge of polycrystalline diamond material, but the section is such a narrow area that considering the fasteners located close to the knife edge, broad areas of the supporting beam are exposed to the material to be cut or the cut material. Since no particular resistant material is provided for the supporting beam in the known bed knife, the areas of the supporting beam in question are exposed to substantial wear.

The purpose of this invention is to improve the bed knife described initially so that the structural cost is reduced in the individual sections and the wear resistance of the bed knife as a whole is increased. This is accomplished pursuant to the invention by providing that each section consists essentially entirely of ceramic cutter material, extends over the regions of the feed and delivery of the material to be cut and the cut material, and is provided with a cutout running in the direction of the bed knife that, starting from an outer face of the section, is designed as a throat with an enlargement pointing toward the interior of the section, with the cutouts of all the sections being aligned with one another and holding a continuous rod extending through several sections with the same dimension that can be tightened together with the sections against the supporting beam by means of screws passing through the throat and penetrating into threaded holes of the rod, which are supported on the supporting beam.

The design of the sections essentially entirely of ceramic cutter material and extending over the other areas of feed and delivery of the material to be cut and the cut material that are subject to wear makes possible simple production of each section, since they do not even have to be assembled into one component subsequently by assembly and joining. In producing the sections, the cutout to hold the continuous rod for fastening the sections to the supporting beam can be made with no problems, since ceramic cutter materials can be pressed in molds in practically any way, after which it is given its hardness characteristics by a process of sintering the ceramic cutter material. Composing the bed knife of the individual sections consisting of ceramic cutter material has the advantage that the shrinkage occurring during the sintering of the ceramic cutter material is limited to one section in each case, that can be given such dimensions directly with respect to its length relative to the length of the bed knife, that the deformations occurring during the shrinkage remain so slight that they can be compensated for directly by a grinding process in the area of the knife edge after the assembly of the sections into the bed knife.

It is desirable to shape the cutout so that it starts from the outer face of the section that is supported as a support face against a support face of the supporting beam during the cutting stress. Because of this arrangement, the bar together with the cutout is not additionally stressed during the cutting stress.

The cross section of the cutout can preferably be of such a shape that the cutout changes into the throat through a support shoulder that runs parallel to the support face. The bar resting behind this step then presses flat against the step when the screws to be introduced into the bar are tightened without being able to cause any force components running radially to the screws, so that the ceramic cutter material is subjected only to compressive stress in the area in question.

If a particularly rigid ceramic material is used, there is the possibility of designing the cutout as a circular bore with a lateral opening in the form of a segment of a circle forming the throat. This shape has the advantage of simple production of the bar in particular.

The bed knife can also beneficially be designed so that a shaft penetrating through the sections parallel to the bar is provided as security against rotation of the sections relative to one another. In this case, the sections area combined in assembly by two bar-shaped elements extending through all of the sections along the bed knife.

A solid connection of the sections as a complete bed knife can be produced beneficially by connecting the sections to the bar and the shaft by adhesive. The adhesive produces a permanent, very stable connection of the sections to the bar and optionally also to the shaft to form a rigid structure that then constitutes the bed knife. Another possibility for the joining consists of connecting the sections under tension to the bar and the shaft by a bolt connection through their ends. With this method of joining, there is the possibility of subsequently separating the sections again and thus disassembling the bed knife, which is an advantage for repairs, for example.

The bed knife can be given a precise support because the support faces of the sections form a smooth planar surface with the surface of the bar in the area of the throat. Because of this machining, a continuous planar support surface is obtained that extends through all of the sections and in the part of the surface of the bar in question. This has the advantage that when the screws penetrating the bar are tightened, the part of the surface of the bar that belongs to the support face is drawn against the support face of the supporting beam, by which the ceramic cutter material is relieved of excessively high compressive stress. However, sufficient stress is passed to the part of each section consisting of the ceramic cutter material, since because of the elasticity of the bar material, particularly steel, a certain deformation of the bar occurs that is greater than that of the ceramic cutter material.

To align the complete bed knife when it is attached to the supporting beam, particularly with reference to a cutting blade moving past it, the bed knife and the supporting beam are beneficially designed so that the screws penetrating into the bar pass through slots in the supporting beam running at right angles to the bar with essentially no clearance, and the bar is provided with slots extending in its longitudinal direction in which fit eccentrically pins projecting from a pivot pin mounted in the supporting beam, by which the rod and thus the sections can be shifted in the direction of the slots by rotating the pivot pins. This method of alignment also makes it possible to compensate for particularly severe wear of the knife edge frequently occurring in the central section of the bed knife by advancing the bed knife in the area of wear toward the cutting blade until the gap caused by the wear is compensated for. It has been found that in spite of such wear of the cutting blade, it largely retains its cutting ability, but the gap formed by the wear between the bed knife and the cutting blade leads to a substantial reduction of the cutting power. Overall, the bed knife then assumes a slightly bent shape.

The bed knife can be used with particular advantage as a counterknife for a strand granulator with a cylindrical cutter, with feed rolls preceding the counterknife, and with the roll next to the counterknife acting together with a stripper placed on the counterknife. Such strand granulators are known. In this case, the shaft can also be used for attaching the stripper, by recessing the stripper in a slot extending over all of the sections and fastening it to the sections by means of screws penetrating the shaft and passing through the stripper.

BRIEF DESCRIPTION OF THE DRAWINGS

Examples of embodiment of the invention are shown in the Figures. The Figures show:

FIG. 1 is the bed knife with a cutting blade moved past it, in side view.

FIG. 3 is a perspective illustration of the bed knife of FIG. 2 together with the associated supporting bean (shown separated).

DESCRIPTION OF THE PREFERRED EMBODIMENT

Figure 2:
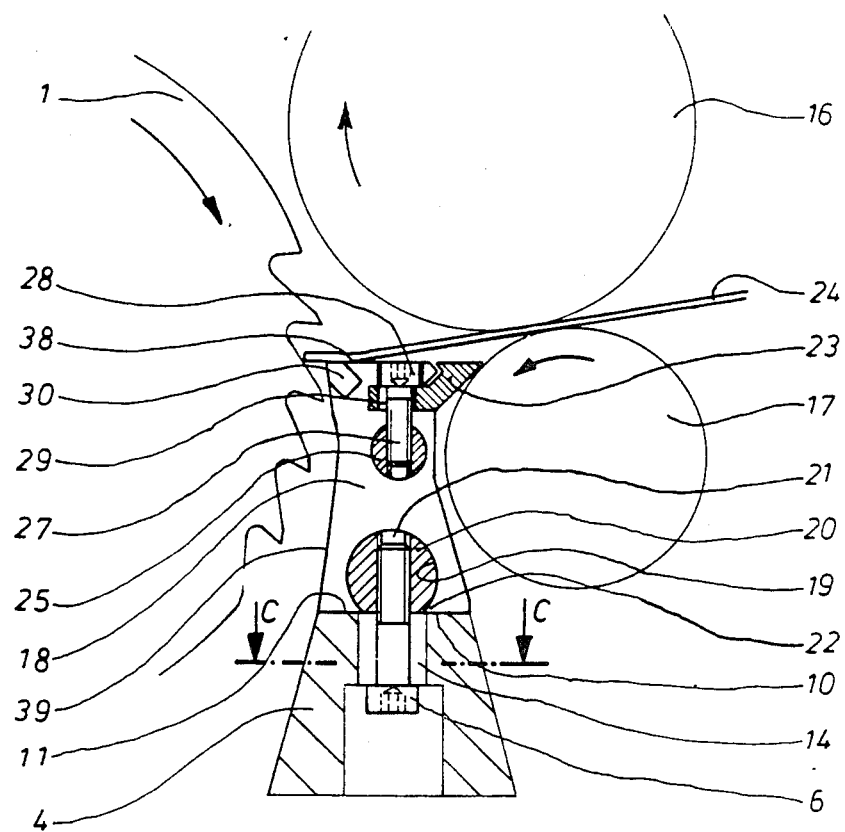
FIG. 2 is a bed knife of similar design in cross section along the line B—B of FIG. 3, on a strand granulator.

FIG. 1 shows the cutting blade in the form of a cylindrical cutter that acts in combination with the bed knife constructed of the individual sections 2, which is shown in FIG. 3 with the overall designation as bed knife 3. The individual successive sections 2 rest on the supporting beam 4 that can be mounted on any machine frame in a way of no interest here. The section 2 consists entirely of ceramic cutter material, and its knife edge therefore constitutes a particularly durable counterknife relative to the cutting blade 1. Because of the overall design of the section 2 of ceramic cutter material over its entire outer surface, this results in special wear resistance relative to material to be cut or cut material that is supplied. The individual sections 2 are fastened to the supporting beam 4 by the screws 6, that penetrate into a bar 7 extending through the sections 2 next to one another. The bar 7 for this purpose is provided with the threaded holes 8, and it has a profile that fits closely into a correspondingly shaped cutout. The cutout 9 is located adjacent to the support face 11 of the supporting beam 4 (see also FIG. 3). The section 2 is supported against the support face 11 of the supporting beam 4 during the cutting stress, so that the joint between section 2 and the supporting beam 4 provided by the screw 6 and the bar 7 is exposed to an additional stress during the cutting process. This connection is made by the screw 6 pulling the bar 7 against the support face 11 when it is tightened with tension being exerted on the section 2 through the step 12 both in the bar 7 and the section 2. The cutout 9 in this case changes into the throat 13 through the support shoulder 12. The passage 14 illustrated in the supporting beam 4 is a slot whose action is discussed in detail in connection with FIGS. 3 and 4. This slot is occupied by the screw 6 with essentially no clearance, so that there is sufficient support surface against the supporting beam 4 both for the bar 7 and for the head 15 of the screw 6. The support shoulder 12 runs parallel to the support face 10 and thus to the support face 11, which causes the support shoulder 12 in the section 2 to be subjected only to compressive stress.

FIG. 2 illustrates a strand granulator in side view consisting of the cutting blade 1 in the form of a cylindrical cutter, the two feed rolls 16 and 17, and the bed knife consisting of the aligned sections 18. The section 18 is supported on the supporting beam 4, as in the arrangement of FIG. 1.

The section 18 here is provided with a cutout of a different shape than in the arrangement of FIG. 1, namely the circular bore 19 that is filled tightly by the cylindrical bar 20. The bar 20 contains the threaded hole 21 into which the screw 6 is screwed. The side of the bar 20 facing the support face 10 changes into this support face 10 in a plane, so that when the screw 6 is tightened, the surface section of the bar 20 in question can be supported against the support face 11 of the supporting beam 4. This position and shape of the bar 20 in the circular bore 19 causes the bar 20 to exert pressure on the throat 22 in the section 18 when the screw 6 is tightened because of the elasticity of the material of the bar 20, preferably steel, which caused the support face 10 of the section 18 also to be pressed against the support face 11.

As is customary in strand granulators, the bed knife consisting of the linear arrangement of the sections 18 is provided with the stripper 23 extending over all of the sections (see also FIG. 3), which causes the strand 24 first entrained by the feed roll 17 when the strand granulator is started to be fed to the bed knife, in this case the aligned sections 18. The frictional stress acting on the stripper 23 therefore occurs only briefly, so that the stripper 23 is subject to practically no wear. It is therefore usually made as a steel strip.

In the bed knife constructed from the sections 18, another component is then used to fasten the stripper 23, namely the shaft 25, that passes through a bore with the same diameter in the sections 18 as a cylindrical component. (This bore is identified in FIG. 3 by the reference symbol 26). This shaft represents special security of the aligned row of sections 18 against rotation. Together with the bar 20, the bed knife in question is thus given high stability with respect to rotating. The screws 27 penetrate into the shaft 25 and their heads 28 press the stripper 23 toward the shaft 25. The section 18 is provided with the slot 29 to hold the stripper 23. The section 18 in this case is also equipped with the knife insert 30 that consists of particularly high-grade ceramic cutter material and is cemented in a corresponding slit in the section 18. The attachment of such a special cutting insert 30 is frequently desirable for cost reasons, since such sections 18 can be produced more economically with the insert 30. However, in operation, nothing changes in the fact that the section 18 consists essentially completely of ceramic cutter material.

FIG. 3 illustrates the supporting beam 4 and the bed knife 3 consisting of the sections 18, in perspective view, with the bed knife 3 and the supporting beam 4 being shown separately from one another for clarity of illustration. It can be seen that the sections 18 contain the circular bore 19 as a cutout, which extends in line through all of the sections 18. The bores 19 and 26 are shown empty here. As seen from FIG. 2, the bore 19 in the assembled condition contains the bar 20, and the bore 26 contains the shaft 25.

With reference to FIG. 3, it will now be shown how the bed knife 3 can be shifted with respect to the supporting beam 4 for alignment. Individual sections 18 of the bed knife 3, in this case the first and third sections from the right, are provided with the slots 31 and 32 in which fit the pins 33 and 34 that project from the pivot pins 35 and 36. The pivot pins 35 and 36 are mounted to rotate in the supporting beam 4. For this rotation, the keyed faces 37 are provided on the pivot pins 35 and 36. When the pivot pins 35 and 36 rotate, their pins 33 and 34 slide back and forth in the slot 31 and 32, which produces a pressure on the sections 18 in question and thus on the part of the bed knife 3 in question because of the eccentricity of the pins 33 and 34 of the pivot pins 35 and 36, with the pressure being across the bed knife 3. The bed knife 3 can then follow this pressure in the transverse direction because the screws 6 of FIGS. 1 and 2 pass through the slots 14 in the supporting beam 4 that run at right angles to the bar 7 or 20. With the screws 6 loosened, the bed knife 3 can then move in the longitudinal direction of the slot 14. Therefore, when the pivot pins 35 and 36 are turned, their pins 33 and 34 can slide back and forth in the associated slots 31 and 32, but they then bring about an entrainment of the bed knife 3, which leads to the mentioned shift of the bed knife 3 in the longitudinal direction of the slots 14. After completing the alignment of the bed knife 3, the screws 6 are then tightened, which presses the bed knife 3 against the support face 11 of the supporting beam 4.

Figure 4:
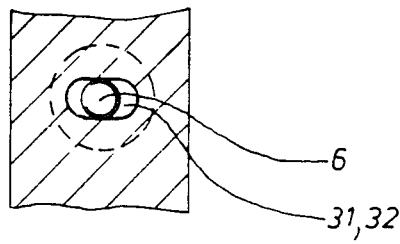
FIG. 4 is a cross section along the line C—C of FIG. 2.

The slot 31 or 32 of FIG. 3 is shown in sectional view of FIG. 4, which represents a cross section along the line C—C of FIG. 2. According to FIG. 5, the screw 6 projects into the slot 31/32 and can be guided back and forth in it with practically no clearance in the longitudinal direction of the slot 31/32.

The bar 7 or 20 and the shaft 25 are cemented into the sections 2 or 18 holding these components, which produces a very solid connection of the components constituting the bed knife in question. After making this connection, the bed knife in question is ground flat in the area of its support face 10, with the rod 7 or 20 in question also being ground flat on its side facing the support face 10, so that a planar surface overall is produced which is then supported by the support face 11 of the supporting beam 4.

As FIG. 2 shows, the plastic strand 24 shown there slides over the top 38 of the section 18, which in the case of continuous operation as is customary with strand granulators, leads to a substantial frictional stress on the top 38, but the ceramic cutter material of which the section 18 consists withstands this directly. Furthermore, the section 18 is impacted in the area of the knife front 39 by granulate that strikes the knife front after being cut off at the knife insert 30. The section 18 consisting of ceramic cutter material can also directly withstand the frictional stress caused in this way.

It is apparent that modifications and changes can be made within the spirit and scope of the present invention, but it is our intention, however, only to be limited by the scope of the appended claims.

As our invention, we claim:

1. A bed knife that acts together with a cutting blade moving past it, particularly for granulating plastic strands, consisting of individual successive sections of the same type that are fastened to a supporting beam and form a continuous knife edge made of a wear-resistant cutter material, characterized by the fact that each section (2,18) consists essentially of ceramic cutter material, extends over the regions of the feed and delivery of the material to be cut and the cut material, and is provided with a cutout (9,19) running in the longitudinal direction of the bed knife (3) that is designed, starting from an outer surface (10) of the sections (2,18), as a throat (13,22) with an enlargement pointing toward the interior of the sections (2,18), with the cutouts (9,19) of all the sections (2,18) being aligned with one another and holding a bar (7,20) extending through several sections (2,18) with the same dimension which can be tightened together with the sections (2,18) against the supporting beam (4) by means of screws (6) supported on the supporting beam (4) passing through the throat (13,22) and penetrating into threaded holes (8,21) in the bar (7,22).

2. A bed knife pursuant to claim 1, characterized by the fact that the cutout (9,19) proceeds from the outer surface of the section (2,18) that is supported against a support face (11) of the supporting beam (4) as a flat support face (10) during the cutting stress.

3. A bed knife pursuant to claim 2, characterized by the fact that the cutout (9) changes into the throat (13) over a support shoulder (12) that runs parallel to the support face (10).

4. A bed knife pursuant to claim 1, characterized by the fact that the cutout is designed as a circular bore (19) with a lateral opening in the form of a segment of a circle that forms the throat (12).

5. A bed knife pursuant to claim 1 characterized by the fact that a shaft (25) passing through the sections (18) parallel to the bar (20) is provided to secure the sections (18) against rotation relative to one another.

6. A bed knife pursuant to claim 1, characterized by the fact that the sections (18) are connected to the bar (20) and the shaft (25) by adhesive.

7. A bed knife pursuant to claim 5, characterized by the fact that the sections are connected under tension to the bar (20) and the shaft (25) by bolt connections through their ends.

8. A bed knife pursuant to claim 7, characterized by the fact that the support faces (10) of the sections (2,18) together with the surface of the bar (7,20) form a smooth planar surface in the area of the throat (13,22).

9. A bed knife pursuant to claim 7, characterized by the fact that the screws (6) pass through slots (14) in the supporting beam (4) at right angles to the bar (7,20), and that the bar (7,20) is provided with slots (31,32) extending in its longitudinal direction which receive eccentricaly mounted pins (33,34) projecting from a pivot pin (35,36) mounted in the supporting beam (4), by which the bar (7,20) and thus the sections (2,18) can be shifted in the direction of the slots (14) by rotation of the pivot pins 10 (35,36).

* * * * *